United States Patent
Hallam et al.

(10) Patent No.: US 9,249,733 B2
(45) Date of Patent: Feb. 2, 2016

(54) GAS TURBINE ENGINE STAND

(71) Applicant: ROLLS-ROYCE PLC, London (GB)

(72) Inventors: Christopher Richard Hallam, Derby (GB); Jonathan Paul Taylor, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 14/527,002

(22) Filed: Oct. 29, 2014

(65) Prior Publication Data
US 2015/0136935 A1    May 21, 2015

(30) Foreign Application Priority Data
Nov. 19, 2013    (GB) .................................. 1320426.8

(51) Int. Cl.
| | |
|---|---|
| B66B 9/16 | (2006.01) |
| F02C 7/20 | (2006.01) |
| B64F 5/00 | (2006.01) |
| F01D 25/28 | (2006.01) |
| G01M 15/14 | (2006.01) |
| G01M 15/02 | (2006.01) |

(52) U.S. Cl.
CPC ................. *F02C 7/20* (2013.01); *B64F 5/0036* (2013.01); *F01D 25/285* (2013.01); *G01M 15/02* (2013.01); *G01M 15/14* (2013.01); *F05D 2220/32* (2013.01); *F05D 2260/02* (2013.01)

(58) Field of Classification Search
CPC ............... B64F 5/0036; F01D 25/285; B65D 2585/687; B65D 2585/6877
See application file for complete search history.

(56) References Cited

U.S. PATENT DOCUMENTS

| | | | | |
|---|---|---|---|---|
| 2,920,773 | A * | 1/1960 | Knabe | 414/743 |
| 2,931,519 | A * | 4/1960 | Beach | 414/589 |
| 2,941,398 | A * | 6/1960 | Pierre et al. | 73/112.04 |
| 3,208,699 | A * | 9/1965 | Karnow et al. | 410/46 |
| 4,440,265 | A * | 4/1984 | Spagnoli | 182/129 |
| 4,461,455 | A * | 7/1984 | Mills et al. | 254/3 R |
| 4,660,796 | A * | 4/1987 | Garrec | 248/544 |
| 4,735,310 | A * | 4/1988 | Lemery et al. | 206/319 |
| 5,645,389 | A * | 7/1997 | Lilja et al. | 414/343 |
| 5,722,512 | A * | 3/1998 | Lilja et al. | 187/244 |
| 5,816,367 | A * | 10/1998 | Lilja et al. | 187/244 |
| 5,870,824 | A * | 2/1999 | Lilja et al. | 29/889.1 |
| 6,000,903 | A * | 12/1999 | Hatch et al. | 414/778 |

(Continued)

FOREIGN PATENT DOCUMENTS

| | | |
|---|---|---|
| WO | 97/19851 A1 | 6/1997 |
| WO | 99/02404 A1 | 1/1999 |

OTHER PUBLICATIONS

May 16, 2014 Search Report issued in British Application No. 1320426.8.

(Continued)

*Primary Examiner* — Bradley Duckworth
(74) *Attorney, Agent, or Firm* — Oliff PLC

(57) ABSTRACT

A gas turbine engine stand comprising an engine frame and a base frame. The base frame has a slide rail to enable axial translation of the engine frame relative to the base frame. A load transfer arrangement engages with a part of the engine frame and slidingly engages with the slide rail. There is a locking mechanism to lock the engine frame to the base frame to prevent relative axial translation. The gas turbine engine stand is used, inter alia, for splitting a core engine from a fan case.

17 Claims, 4 Drawing Sheets

(56) References Cited

U.S. PATENT DOCUMENTS

| | | | |
|---|---|---|---|
| 6,170,141 B1 * | 1/2001 | Rossway et al. | 29/281.1 |
| 6,485,247 B1 | 11/2002 | Groves et al. | |
| 7,841,814 B2 * | 11/2010 | Miller | 410/47 |
| 8,621,873 B2 * | 1/2014 | Robertson et al. | 60/796 |
| 8,672,606 B2 * | 3/2014 | Glynn et al. | 415/1 |
| 8,833,776 B2 * | 9/2014 | Boulanger et al. | 280/35 |
| 2003/0014961 A1 | 1/2003 | Lawlor et al. | |
| 2008/0187431 A1 * | 8/2008 | Brown et al. | 415/1 |
| 2012/0110816 A1 * | 5/2012 | Groves et al. | 29/428 |
| 2012/0224944 A1 * | 9/2012 | Boulanger et al. | 414/754 |
| 2013/0306830 A1 | 11/2013 | Acuna et al. | |
| 2014/0013768 A1 * | 1/2014 | Laing et al. | 60/796 |
| 2014/0123656 A1 * | 5/2014 | Sancewich et al. | 60/752 |

OTHER PUBLICATIONS

Mar. 24, 2015 Search Report issued in European Application No. 14 19 0643.

* cited by examiner

GAS TURBINE ENGINE STAND

BACKGROUND OF THE INVENTION

The present invention relates to a gas turbine engine stand. In particular it relates to a stand that supports a gas turbine engine or a core engine thereof.

Gas turbine engines, particularly those used to power aircraft, must be transported off-wing periodically. For example, spare or replacement engines must be transported to the location of the storage facility or the aircraft to which they are to be fitted. Other engines must be removed from service and transported to the manufacturer or a repair and overhaul base for maintenance activity. Such transportation is typically achieved by loading the engine into the hold of a cargo aircraft such as a Boeing 747-400F or Boeing 777-200ERF.

Some modern gas turbine engines are too large to fit into the hold of such an aircraft. Thus it is necessary to split the engine into two components: the fan case and the core engine. Each of these components may then be loaded into the cargo bay separately, for example on air freight pallets, since neither of them exceeds the maximum dimensions of the hold and cargo bay doors.

BRIEF SUMMARY OF THE INVENTION

The present invention provides a gas turbine engine stand that seeks to address the aforementioned problems.

Accordingly the present invention provides a gas turbine engine stand comprising:
- an engine frame;
- a base frame having a slide rail to enable axial translation of the engine frame relative to the base frame;
- a load transfer arrangement comprising a first engagement feature to engage with a part of the engine frame and a second engagement feature to slidingly engage with the slide rail;
- a locking mechanism to lock the engine frame to the base frame to prevent relative axial translation; and
- a load path selection mechanism to select and engage one of the locking mechanism and the load transfer arrangement as the load path between the engine frame and the base frame.

Advantageously the gas turbine engine stand of the present invention enables controlled axial separation or reassembly of a gas turbine engine whilst preventing any lateral, vertical or twisting movement.

The engine frame may be configured to support a gas turbine engine or a core engine of a gas turbine engine. Advantageously the stand can support a gas turbine engine when removed from or ready for fitting to an aircraft. It can also support the gas turbine engine in preparation for splitting or following reassembly. It can support a core engine in preparation for reassembly of a gas turbine engine or following engine splitting. The stand is suitable for air freight, as well as for road or sea freight. Advantageously the gas turbine engine or core engine does not need to be transferred to another piece of tooling for transportation.

The stand may further comprise an intermediate frame that is fixed in axial alignment with the engine frame and is engaged by the first engagement feature of the load transfer arrangement. Advantageously the intermediate frame provides a convenient mechanism to separate or decouple the axial translation, vertical translation and load path change functionality of the stand from each other.

The engine frame may comprise at least on load transfer flange to engage with the first engagement feature. The intermediate frame may comprise at least on load transfer flange to engage with the first engagement feature. Advantageously the load transfer flange acts to focus and direct the load path.

The load transfer flange may be engaged by extension of the load transfer arrangement. The load transfer flange may be located vertically above the load transfer arrangement and the load transfer arrangement extended to abut, pass into or pass through the load transfer flange or a feature thereof.

The load transfer arrangement may include a jack to vertically translate the engine frame relative to the base frame. The load transfer arrangement may include a jack to vertically translate the intermediate frame relative to the base frame. Advantageously the jack may be hydraulic so that it can be relatively easily actuated and can lift the weight of the engine frame, intermediate frame where used, and gas turbine engine or core engine supported by the stand.

The jack may have at least two defined vertical positions. One of the defined vertical positions may correspond to the locking mechanism being engaged and one of the defined vertical positions may correspond to the load transfer arrangement being engaged. Advantageously the vertical position of the jack may at least partially comprise the load path selection mechanism since the jack cannot be in more than one of the defined vertical positions at once.

The base frame may have two slide rails that are parallel to each other. Alternatively the base frame may have two slide rails on each side, the slide rails on opposite sides being parallel to each other. Advantageously the slide rails being parallel prevents any twisting during axial translation of the engine frame, and intermediate frame where used, relative to the base frame.

The stand may further comprise two load transfer arrangements. The stand may alternatively comprise four load transfer arrangements, two on each side. Advantageously there may be one load transfer arrangement to engage each slide rail.

The stand may further comprise a height adjustment arrangement to enable vertical translation of the engine frame relative to the intermediate frame. Alternatively the height adjustment arrangement may enable vertical translation of the engine frame relative to the base frame. Advantageously the height adjustment arrangement controls the vertical movement translation of the engine frame so that the alignment and orientation of the engine frame is unchanged.

The height adjustment arrangement may have at least two defined vertical positions. One of the defined vertical positions may correspond to an engine split position and one of the defined vertical positions may correspond to a transportation position. The height adjustment arrangement may have four defined vertical positions. One of the defined vertical positions may correspond to an engine split position, one of the defined vertical positions may correspond to an air transportation position, one of the defined vertical positions may correspond to a bootstrap position and one of the defined vertical positions may correspond to a road transportation position of the core engine. The bootstrap position may also be used for road transportation of a whole gas turbine engine. Advantageously the different heights can be fixed by a guide pillar and locking pin or another mechanism.

The stand may further comprise an axial drive mechanism to effect the axial translation of the engine frame relative to the base frame. The drive mechanism may be hydraulic. It may be actuated by hand or by machine. Advantageously the drive mechanism enables controlled axial movement.

The base frame may further comprise alignment features to engage with corresponding features on a gas turbine engine fan stand. Advantageously this assists in aligning the components supported by or to be supported by the gas turbine engine stand and gas turbine engine fan stand.

The present invention also provides a gas turbine engine stand assembly comprising: a gas turbine engine fan stand having a base frame and a fan case frame; and a gas turbine engine stand as described. Advantageously the assembly enables a gas turbine engine to be supported, axially separated and axially reassembled.

Any combination of the optional features is encompassed within the scope of the invention except where mutually exclusive.

BRIEF DESCRIPTION OF THE DRAWINGS

The present invention will be more fully described by way of example with reference to the accompanying drawings, in which.

DETAILED DESCRIPTION

Figure 1:
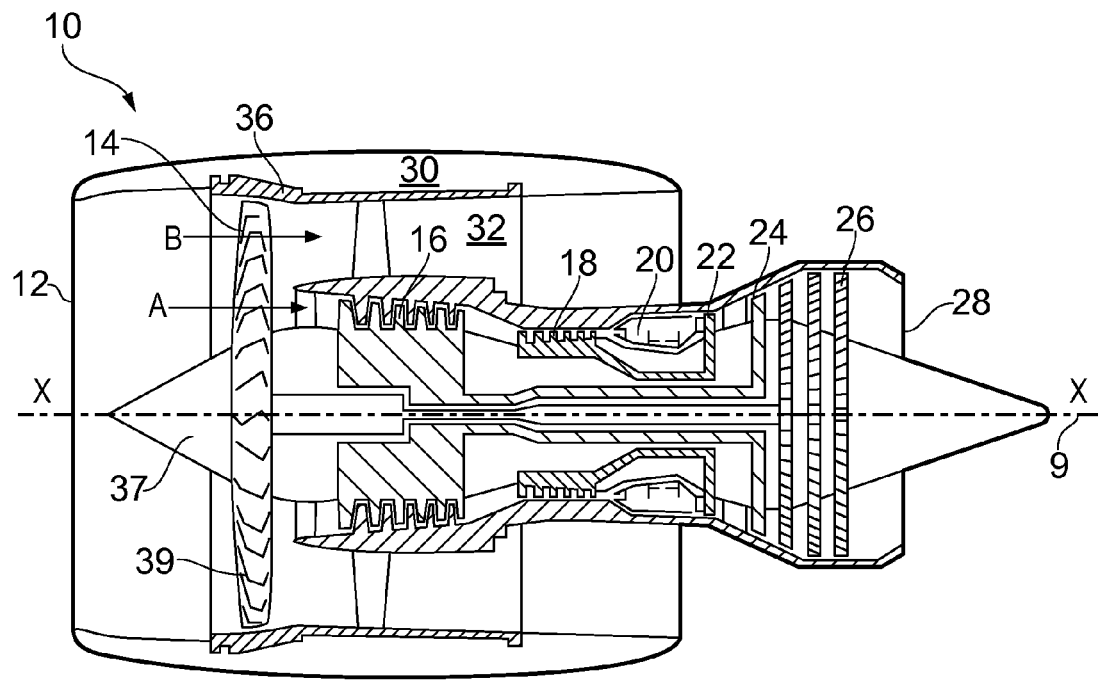
FIG. 1 is a sectional side view of a gas turbine engine.

A gas turbine engine 10 is shown in FIG. 1. It has a rotational axis 9 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. These components form the core engine 34. A nacelle 30 surrounds the gas turbine engine 10 and defines, in axial flow B, a bypass duct 32. The fan 14 and air intake 12 are surrounded by an annular fan case 36. For the purposes of this invention the nacelle 30 does not form part of the gas turbine engine 10.

Figure 2:
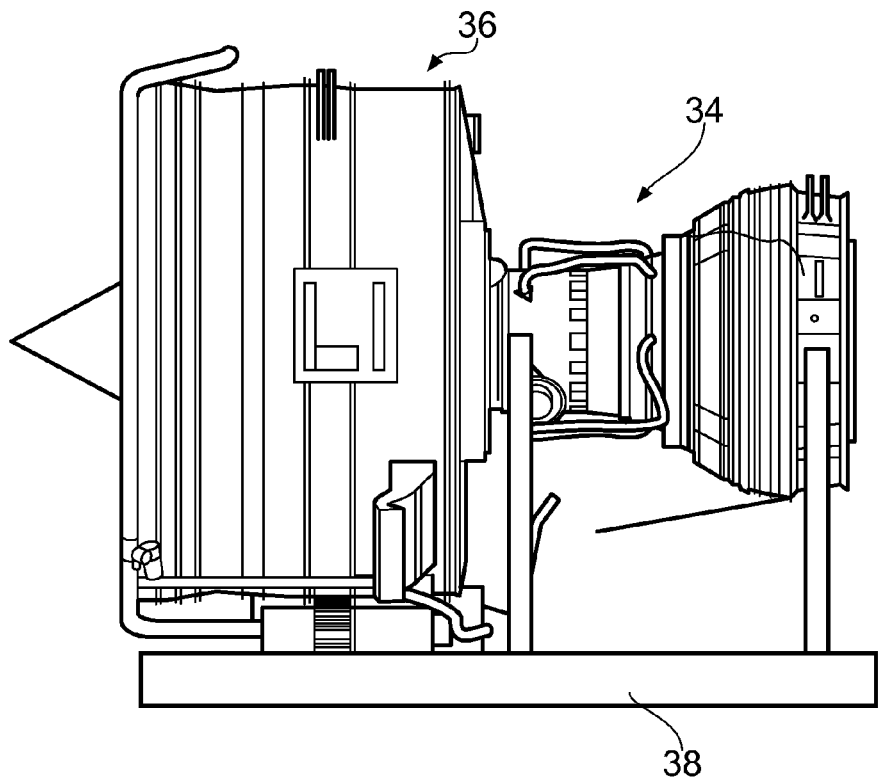
FIG. 2 is a schematic side view of a gas turbine engine supported by a gas turbine engine stand according to the present invention.
Figure 3:
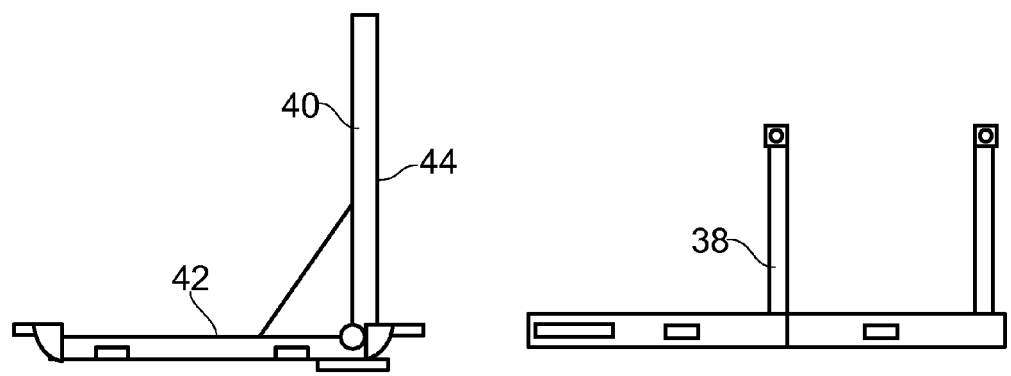
FIG. 3 is a schematic side view of a fan stand and a gas turbine engine stand according to the present invention.

FIG. 2 shows the core engine 34 and the fan case 36 supported in the horizontal orientation, that is with the axis 9 substantially horizontal, by a gas turbine engine stand 38. Prior to axial separation of the core engine 34 and fan case 36 the spinner 37 and fan blades 39 are removed. Also prior to axial separation, features of the engine 10 such as the bifurcation duct and A-frame are removed. The core engine 34 and fan case 36 are coupled by an annular array of fastenings. FIG. 3 shows, highly schematically, a fan stand 40 and a gas turbine engine stand 38 according to the present invention. The fan stand 40 comprises a base frame 42 and a fan case frame 44.

Figure 4:
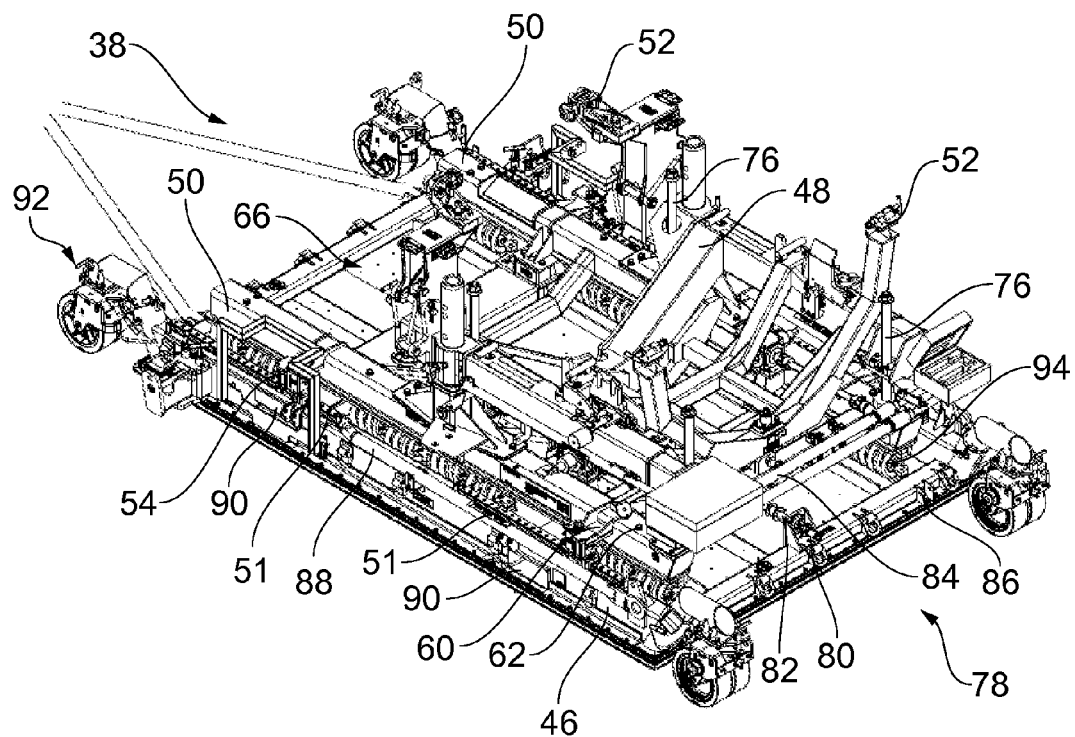
FIG. 4 is a perspective rear view of a gas turbine engine stand according to the present invention.
Figure 5:
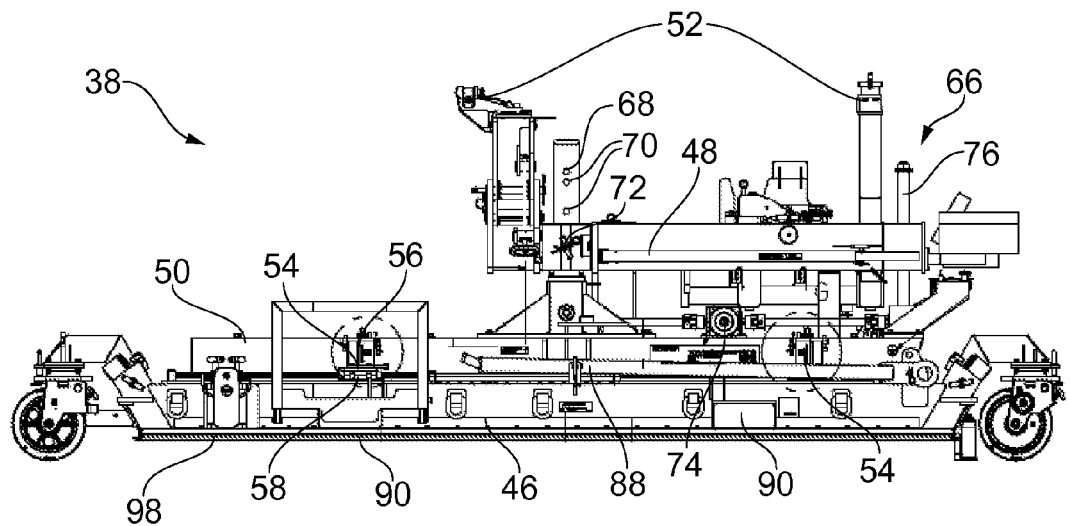
FIG. 5 is a side view of a gas turbine engine stand according to the present invention.

The gas turbine engine stand 38 is shown in more detail in FIG. 4 and FIG. 5. The gas turbine engine stand 38 comprises a base frame 46, an intermediate frame 50 and an engine frame 48. The base frame 46 is substantially rectangular or square and is designed to sit firmly on the floor of a repair shop or on the ground where engine splitting or reassembly is performed outside. Optionally, therefore, it comprises adjustable feet or other means of providing a stable and flat platform. It may also comprise wheels, castors or the like to permit the gas turbine engine stand 38 to be moved into position. The wheels may be retractable.

The intermediate frame 50 is also substantially rectangular or square. It is substantially the same size as the base frame 46 and is positioned thereon. Shock attenuation 94, for example stiff coil springs to cushion a supported gas turbine engine 10 or core engine 34, may be provided between the base frame 46 and the intermediate frame 50. Optionally, the shock attenuation 94 may be disabled in some uses of the gas turbine engine stand 38, for example during air freight.

The base frame 46 further comprises an elongate slide rail 51 on each side of the gas turbine engine stand 38. Preferably there may be two slide rails 51 on each side of the gas turbine engine stand 38, one towards the front and one towards the rear. The slide rails 51 are rigidly secured to the base frame 46 and extend towards the front and back of the gas turbine engine stand 38. In other embodiments the slide rails 51 may be integrally formed as a single component with the base frame 46. The slide rails 51 are parallel to each other. The slide rails 51 are I-shaped in cross-section and comprise an integral slider which is mounted to the slide rail 51 by bearings in order to translate along the slide rail 51 without lateral, vertical or twisting movement relative to the slide rail 51.

The engine frame 48 of the gas turbine engine stand 38 is configured to have a complementary shape to a core engine 34 and to support either such a core engine 34 or a full gas turbine engine 10. The engine frame 48 occupies a substantially square or rectangular area above the base frame 46. It is shorter, front to back, than the base frame 46 but may be substantially the same width. The engine frame 48 supports the core engine 34 of a gas turbine engine 10 so that the fan case 36, if attached, is suspended over the portion of the base frame 46 in front of the engine frame 48. Preferably the gas turbine engine stand 38 is symmetrical about a longitudinal axis passing from front to back. The engine frame 48 may comprise two parts which are secured together. One of the parts forms a cradle which may be retained with the engine 10 or core engine 34 during lifting or lowering from an aircraft as will be described below.

The engine frame 48 has at least one attachment point 52, preferably a plurality of attachment points 52. The attachment points 52 are located and arranged to engage with suitable complementary features on a core engine 34 to enable the core engine 34 to be releasably secured to the engine frame 48. For example, bolts, dowels or other temporary fastenings may be used to couple features on the core engine 34 to the attachment points 52 on the engine frame 48.

The gas turbine engine stand 38 further comprises a load transfer arrangement, jack 54. In one embodiment, as illustrated, there are four jacks 54 arranged two on each side of the base frame 46. The jacks 54 may be configured to slide along the slide rails 51 between a first storage position and a second load path position. Optionally there may be suitable locking features to retain the jacks 54 in their storage positions to prevent the jacks 54 moving unintentionally, for example when the gas turbine engine stand 38 is moved. In the load path position the jack 54 acts to transfer the load of the gas turbine engine 10 or core engine 34 supported by the engine frame 48 to the base frame 46 where the loads are reacted.

Each jack 54 comprises a first engagement feature 56 configured to engage with a part of the engine frame 48 as will be described. Each jack 54 also comprises a second engagement feature 58 configured to engage with the slider of the slide rail 51 and to enable the jack 54 to slide along the slide rail 51 as will be described.

The intermediate frame 50 further comprises a load transfer flange 60, preferably two flanges 60 on each side of the intermediate frame 50. The flanges 60 are sufficiently massive to take all the loads from the supported gas turbine engine 10 or core engine 34 between them. The second load path position of each jack 54 is vertically aligned with one of the load transfer flanges 60 of the engine frame 48. The first engagement feature 56 of the jack 54 is arranged to engage with the load transfer flange 60. For example, the first engagement feature 56 may be a protrusion which is received within a complementary recess in the flange 60 and thereby prevents relative movement between them. Alternatively, the first engagement feature 56 may be a threaded bolt which passes through an aperture in the flange 60 and is secured by a nut to prevent relative movement between the jack 54 and flange 60, or the first engagement feature 56 may be a protrusion which passes through an aperture in the flange 60 or is received in a slot in the flange 60 and is secured by a split pin or other releasable locking feature.

The first engagement feature 56 of the jack 54 may be brought into engagement with the load transfer flange 60 by vertical extension of the jack 54. Thus the jack 54 may be positioned beneath the flange 60 and then extended in the vertical direction, by hydraulics or a screw thread, to insert the first engagement feature 56 into the complementary recess or through the complementary aperture in the flange 60. Advantageously the engagement between the jack 54 and the flange 60 is therefore completed without loading the jack 54 which reduces the likelihood of damage to either component by misalignment, for example.

The gas turbine engine stand 38 includes a locking mechanism 62, for example an array of corresponding apertures and fastenings, to lock the intermediate frame 50 to the base frame 46 to prevent relative axial movement between them. In one example, the fastenings may be bolts held in place by nuts or split pins. The locking mechanism 62 is arranged to be releasable so that the intermediate frame 50 and base frame 46 can be securely locked together when required or detached to permit relative axial translation as will be described. The locking mechanism 62 may also be arranged to engage with spacers or other features in order to temporarily disable the shock attenuation 94 of the base frame 46. Preferably when the locking mechanism 62 is engaged the jack or jacks 54 are in their first storage positions. When the locking mechanism 62 is engaged the entire load from the core engine 34 or gas turbine engine 10 is taken through the locking mechanism 62 and thereby transferred to the base frame 46.

There is a load path selection mechanism that is used to select and engage one of the locking mechanism 62 and the load transfer arrangement, jacks 54. Thus either the locking mechanism 62 is engaged to secure the intermediate frame 50 vertically to the base frame 46 or the jack 54 is engaged to the load transfer flange 60. In order for the jack 54 to take up and transfer the entire load from the core engine 34 or gas turbine engine 10, it must be vertically extended to lift the intermediate frame 50 away from the base frame 46. It is only necessary to vertically separate the intermediate frame 50 and base frame 46 by a few millimeters. Optionally, the load path selection mechanism may comprise a stop that prevents the locking mechanism 62 being engaged when the jack 54 is in position and loaded or prevents the jack 54 from being moved into position and loaded if the locking mechanism 62 is engaged. Alternatively load path selection is performed by the combination of engaging or disengaging the locking mechanism 62 and moving the jacks 54 into the correct position and loading or unloading them.

A height adjustment arrangement 66 is provided on the gas turbine engine stand 38, as best seen in FIG. 5. Each height adjustment arrangement 66 is configured to allow the vertical position of the engine frame 48 to be changed relative to the intermediate frame 50. Preferably there are four height adjustment arrangements 66, one situated at each corner of the engine frame 48. For example, each height adjustment arrangement 66 may comprise a lead screw 76 that engages with the engine frame 48 and reacts against the intermediate frame 50 to which it is coupled or secured. The height adjustment arrangements 66 are coupled together via shafts and gearboxes to a single adjustment point 74, to which a spanner or other tool may be coupled. By adjusting the adjustment point 74 using suitable tooling, the engine frame 48 is raised or lowered relative to the intermediate frame 50. The coupling of the lead screws 76 means that the four corners of the engine frame 48 move in unison during raising or lowering. Advantageously this minimises stress and strain on the engine frame 48, intermediate frame 50, lead screws 76, gearboxes and shafts. Alternatively each height adjustment arrangement 66 may comprise a hydraulic piston or bolt.

A guide pillar 68 having a number of apertures 70 bored through it extends vertically upward from the intermediate frame 50. The guide pillar 68 is secured or coupled to the intermediate frame 50. The engine frame 48 comprises a vertically aligned cylindrical bore through which the guide pillar 68 passes. The engine frame 48 comprises an aperture that is aligned with one of the apertures 70 when the engine frame 48 is at the appropriate height above the intermediate frame 50. A locking pin 72 can be inserted through the aperture in the engine frame 48 and into one of the apertures 70 in the guide pillar 68 in order to lock the engine frame 48 at that height above the intermediate frame 50.

In one embodiment of the present invention there are four apertures 70 through the guide pillar 68. The lowest corresponds to an air transportation position, in which the core engine 34 is transported by air freight on the gas turbine engine stand 38 of the present invention. The next aperture 70 up the guide pillar 68 corresponds to a road transportation position, in which the core engine 34 is transported by road or sea freight on the gas turbine engine stand 38 of the present invention. The third aperture 70 corresponds to a bootstrap position. Bootstrap is the term used for direct lifting of a gas turbine engine 10 to or from an aircraft using a strap or cradle mounted to the nacelle 30 or aircraft pylon rather than using an independent crane. It is beneficial that the engine frame 48 of the gas turbine engine stand 38 be high to receive or deliver a gas turbine engine 10 for bootstrapping so that the distance between the gas turbine engine 10 and the nacelle 30 is minimised. It is also beneficial so that there is additional clearance between the fan case 36 and the base frame 46 of the gas turbine engine stand 38 to prevent damage if the gas turbine engine 10 is not lifted or lowered perfectly vertically. The bootstrap position is also used for road transportation of the whole gas turbine engine 10 on the gas turbine engine stand 38 of the present invention. The highest aperture 70 corresponds to an engine split height, in which the core engine 34 and fan case 36 may be separated or joined.

The gas turbine engine stand 38 comprises a drive mechanism 78, which can be seen in FIG. 4, to effect axial movement of the engine frame 48 and intermediate frame 50 relative to the base frame 46. The drive mechanism 78 comprises an actuation point 80 to which a drive handle or similar can be coupled. The actuation point 80 is directly coupled to a drive shaft 82 which may be threaded. A drive arm 84 is mounted to the engine frame 48. It is shown in a disengaged position but can be moved into a position in which it engages the drive shaft 82, for example with protrusions that intermesh with the thread of the drive shaft 82 or by engaging a bobbin mounted on the shaft 82. The drive mechanism 78 is therefore configured, with the drive arm 84 engaged with the drive shaft 82, to cause translation of the engine frame 48 and intermediate frame 50 axially forwards or backwards relative to the base frame 46 when a drive handle is used to rotate the actuation point 80. The engine frame 48 and intermediate frame 50 translate axially in unison.

Although a single drive mechanism 78 has been shown it is within the scope of the present invention to provide two or more drive mechanisms 78. Preferably where more than one drive mechanism 78 is provided they are ganged together in some manner so that they act in concert. Hence the engine frame 48 and intermediate frame 50 cannot twist relative to the base frame 46.

Figure 6:
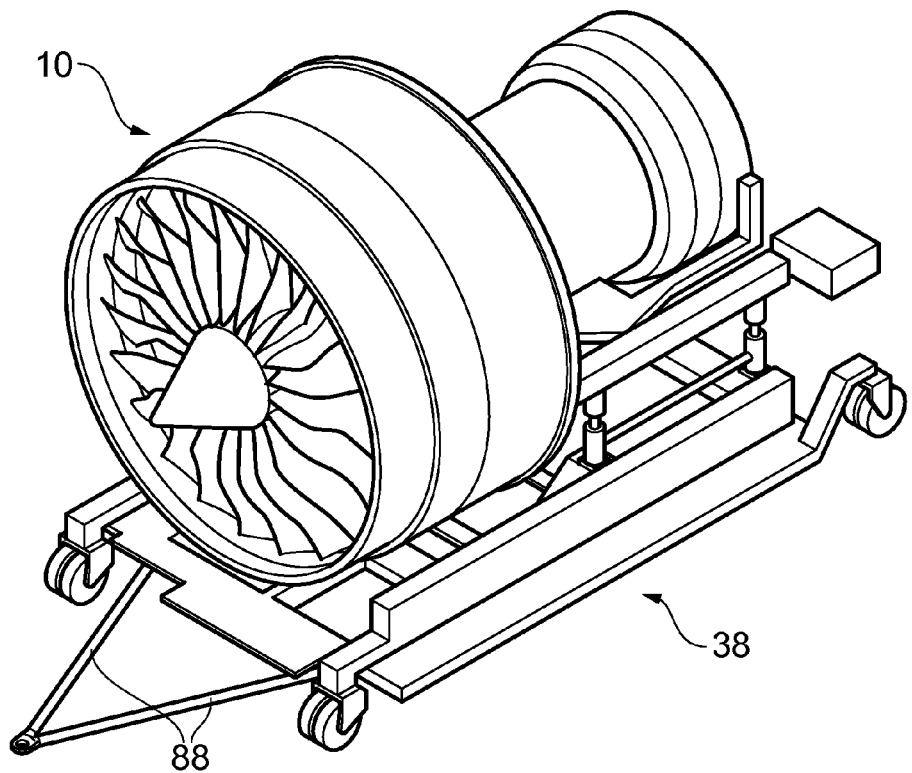
FIG. 6 is a perspective front view of a gas turbine engine supported by the gas turbine engine stand according to the present invention.

Thus the gas turbine engine stand 38 is initially configured with the engine frame 48 positioned over the back of the base frame 46, that is close to the drive mechanism 78, and the locking mechanism 62 is engaged to secure the base frame 46 and intermediate frame 50 against relative axial movement. In this position the engine frame 48 may be raised to the bootstrap height to receive a gas turbine engine 10 from an aircraft pylon. The gas turbine engine 10 is received so that the core engine 34 is aligned with the attachment points 52 and the fan case 36 is forward of the engine frame 48. The core engine 34 of the gas turbine engine 10 is secured to the engine frame 48 at the attachment points 52 before the engine frame 48 is raised to the engine split height, the position illustrated in FIG. 6.

The locking mechanism 62 is then released and the jacks 54 moved into position under the flanges 60. The jacks 54 are raised a small amount, a few millimeters, in order to vertically separate the intermediate frame 50 from the base frame 46. A fan stand 40 is moved into position in front of the gas turbine engine 10 and adjusted as required to be ready to receive the fan case 36.

Optionally accessories to and parts of the gas turbine engine 10 may be removed. For example, the radial drive shaft, externally mounted wiring harness and pipework, bifurcation and A-frame may be removed. The fan blades 39 and spinner 37 may also be removed.

The drive arm 84 can then be brought into engagement with the drive shaft 82 and a drive handle turned on the actuation point 80 to cause the engine frame 48 and intermediate frame 50 to translate axially forwards with the jacks 54 sliding along the slide rails 51 due to the engagement of the second engagement feature 58 with the slide rail 51. For example, the second engagement feature 58 may be one or more bolts or welds that secure the jack 54 to the slider of the slide rail 51. Advantageously the sliding engagement of the jacks 54 with the slide rails 51 on each side of the gas turbine engine stand 38 prevent any lateral movement of the intermediate frame 50 and thus the engine frame 48 and the gas turbine engine 10 supported thereon. The drive mechanism 78 is actuated until the fan case 36 of the gas turbine engine 10 is close to the fan stand 40. The fan case 36 can then be coupled to the fan stand 40 and then decoupled from the core engine 34, for example by removing an annular array of fastenings therebetween. Optionally the engine frame 48 may be raised or lowered using the height adjustment arrangements 66 to accommodate the change of load taken by the gas turbine engine stand 38 as some of the weight is taken by, the fan stand 40. Alternatively or additionally the height of the fan stand 40 may be adjusted to accommodate this load change.

The engine frame 48 and intermediate frame 50 may then be axially translated backwards using the drive mechanism 78 actuated in reverse. This moves the core engine 34 away from the fan case 36, which remains supported wholly by the fan stand 40. Advantageously by axially translating the engine frame 48 and intermediate frame 50 to separate the core engine 34 and fan case 36 it guarantees that no lateral or vertical movements will be made which could result in the fan case 36 and core engine 34 making contact and becoming damaged. This is particularly advantageous where the clearance between these components is of the order of a few millimeters only as is common in large gas turbine engines 10 for aircraft power applications. Optionally the fan case 36 may also be axially translated by moving the fan stand 40 upon which it is supported.

The jacks 54 should then be lowered to bring the intermediate frame 50 into vertical abutment with the base frame 46, the drive mechanism 78 disengaged and the locking mechanism 62 engaged to prevent further axial movement. The engine frame 48 may then be lowered to the road or air transportation position, and the core engine 34 be prepared for transportation. For example, a cover may be put over the core engine 34 to protect it.

In another mode of operation the gas turbine engine stand 38 initially supports a core engine 34 coupled to its attachment points 52. The engine frame 48 is raised to the engine split height using the height adjustment arrangements 66. The locking mechanism 62 is released and the jacks 54 moved into vertical alignment with the flanges 60 and extended to raise the intermediate frame 50 slightly from the base frame 46. The drive mechanism 78 is then engaged and used to axially translate the core engine 34 on the engine frame 48 and intermediate frame 50 forwards towards a fan case 36 supported by a fan stand 40. The fan case 36 may then be coupled to the core engine 34 and then decoupled from the fan stand 40. The height of the gas turbine engine stand 38 may be adjusted using the height adjustment arrangements 66 to accommodate the load change as the fan case 36 is decoupled from the fan stand 40. The drive mechanism 78 can then be actuated in the reverse direction to axially translate the engine frame 48 and intermediate frame 50, and the gas turbine engine 10 now supported by it, backwards.

The jacks 54 should then be lowered to bring the intermediate frame 50 into vertical abutment with the base frame 46, the drive mechanism 78 disengaged and the locking mechanism 62 engaged to prevent further axial movement. The engine frame 48 may then be lowered to the road or air transportation position and the gas turbine engine 10 be prepared for transportation. For example, a cover may be put over the gas turbine engine 10 for road transportation.

There may optionally be one or more towing point 86 provided at one or both ends of the base frame 46 of the gas turbine engine stand 38. The towing points 86 are arranged symmetrically and are configured to couple to one end of towing arms, such as the towing arm 88 showed stowed on the side of the base frame 46 in FIG. 4 and FIG. 5, for example using clevis and pin arrangements. The other end of the towing arm 88 or towing arms 88 may then be coupled to a vehicle for towing the gas turbine engine stand 38 either when supporting a gas turbine engine 10 or core engine 34 or when empty.

There are also two forklifting apertures 90 on each side of the base frame 46 that are connected by channels extending through the base frame 46. The forklifting apertures 90 are sized and spaced to receive the prongs of a forklift truck therethrough. This provides a convenient mechanism for lifting and moving the gas turbine engine stand 38, whether it supports a gas turbine engine 10, a core engine 34 or is empty.

Advantageously the gas turbine engine stand 38 of the present invention may support a gas turbine engine 10 or a core engine 34 for air or road transportation because the base frame 46 acts as a transport pallet or is mounted thereto. In particular, the base frame 46 may be sized and shaped to act as an air freight pallet or may be coupled to an air freight pallet 98, by bolts or other means. There may be different engine frame 48 heights for air transportation, road transportation of the core engine 34 and road transportation of the whole gas turbine engine 10, for example due to the greater vibrational loads placed on the gas turbine engine 10 or core engine 34 during road transportation than during air transportation. Additionally it is more likely that the gas turbine engine stand 38 will support only the core engine 34 during air transportation but will support the whole gas turbine engine 10 during road transportation so will require more vertical clearance for the fan case 36.

The gas turbine engine stand 38 optionally comprises an alignment feature 92. For example there may be two alignment features 92 that are the castors or wheels for moving the gas turbine engine stand 38, or may be prongs extending from the front of the base frame 46. The alignment features 92 are configured to engage with complementary alignment features on the fan stand 40. Advantageously, the engagement of the alignment features 92 ensures that a core engine 34 and fan case 36 supported by the gas turbine engine stand 38 and fan stand 40 respectively are substantially aligned. Rotation and tilt functionality of the fan stand 40 then allows fine tuning of the alignment of the components. Similarly, the engagement of the alignment features 92 ensures that the fan stand 40 and a gas turbine engine 10 supported by the gas turbine engine stand 38 are substantially aligned. Rotation and tilt functionality of the fan stand 40 then allows fine tuning of the alignment of the components.

Figure 7:
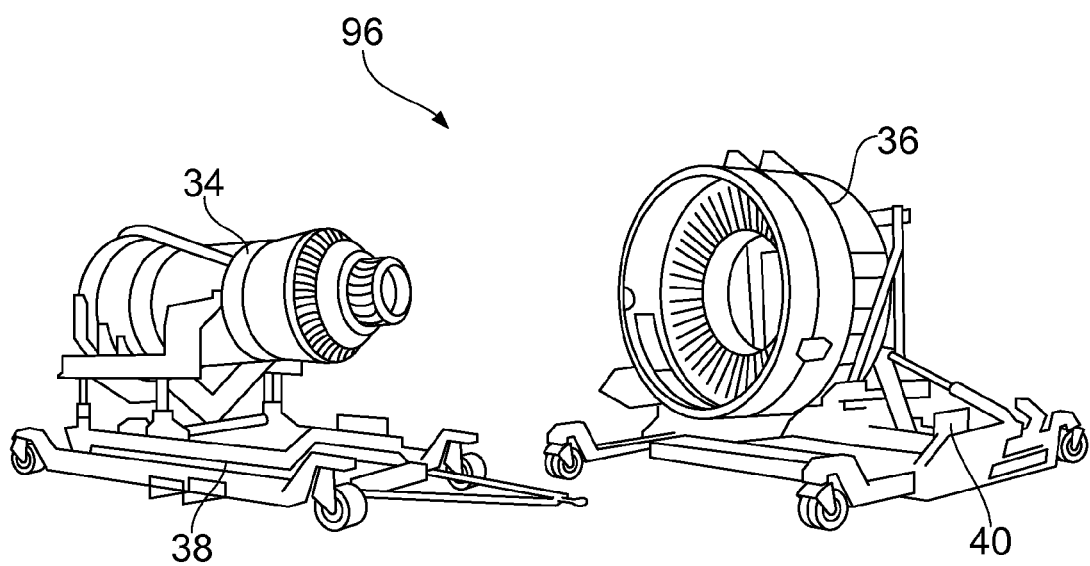
FIG. 7 is a perspective view of a gas turbine engine stand assembly according to the present invention.

The present invention also comprises a gas turbine engine stand assembly 96 as shown in FIG. 7. The stand assembly 96 comprises a gas turbine engine stand 38 as described above. It also comprises a fan stand 40, as briefly described with respect to FIG. 3.

The gas turbine engine stand 38 has been described with two slide rails 51 on each side. However, in other embodiments there may be only one slide rail 51 provided on each side or only one slide rail 51, for example halfway between the sides of the base frame 46. Alternatively there may be more than two slide rails 51 on each side, all of which are parallel.

Preferably the base frame 46 is held stationary whilst the engine frame 48 and intermediate frame 50 are translated axially using the drive mechanism 78. However, alternatively the base frame 46 may move as well as the intermediate frame 50 and engine frame 48. Other implementations of a drive mechanism 78 may be used within the scope of the present invention. For example, a hydraulic or winch arrangement may be used instead of the threaded drive arm 82.

Advantageously the present invention enables axial separation of the first and second annular components with controlled concentricity of the components. This is particularly beneficial where the radial clearance between the first and second annular components is tight, as is often the case for large gas turbine engines 10.

The intermediate frame 50 beneficially enables separation of the axial translation, vertical translation and load path change functionality of the gas turbine engine stand 38 of the present invention. Alternatively the intermediate frame 50 may be omitted and the functionality provided by features of the engine frame 48 and base frame 46.

Although the present invention has been described with respect to a three-shaft gas turbine engine 10 it is also applicable to a two-shaft gas turbine engine. In a two-shaft gas turbine engine the core engine 34 comprises the high pressure compressor 18, combustor 20, high pressure turbine 22 and low pressure turbine 26. It may also comprise a low pressure booster compressor.

Although the present invention has been described with respect to a gas turbine engine for powering an aircraft, it has equal felicity for gas turbine engines for industrial and marine applications.

The present invention also has applicability to other annular systems which need to be separated and joined axially, particularly those for which the first and second annular components overlap axially and for which the tolerance between the first and second annular components is tight. For example, wind turbines, tidal turbines and separating large diameter pipe sections of an oil or gas pumping pipeline. In this case the separated sections may be displaced vertically from each other, rather than axially.

The invention claimed is:

1. A gas turbine engine stand configured for supporting a core engine comprising:
   an engine frame supporting the core engine;
   a base frame having a slide rail to enable axial translation of the engine frame relative to the base frame;
   a load transfer arrangement comprising a first engagement feature to engage with a part of the engine frame and a second engagement feature to slidingly engage with the slide rail;
   a locking mechanism to lock the engine frame to the base frame to prevent relative axial translation,
   wherein one of the locking mechanism and the load transfer arrangement is selected and engaged as a load path between the engine frame and the base frame.

2. The gas turbine engine stand as claimed in claim 1 wherein the engine frame is configured to support a gas turbine engine.

3. The gas turbine engine stand as claimed in claim 1 further comprising an intermediate frame that is fixed in axial alignment with the engine frame and is engaged by the first engagement feature of the load transfer arrangement.

4. The gas turbine engine stand as claimed in claim 3 wherein the intermediate frame comprises at least one load transfer flange to engage with the first engagement feature.

5. The gas turbine engine stand as claimed in claim 4 wherein the load transfer flange is engaged by extension of the load transfer arrangement.

6. The gas turbine engine stand as claimed in claim 5 wherein a jack has at least two defined vertical positions.

7. The gas turbine engine stand as claimed in claim 6 wherein one of the defined vertical positions corresponds to the locking mechanism being engaged and one of the defined vertical positions corresponds to the load transfer arrangement being engaged.

8. The gas turbine engine stand as claimed in claim 3 further comprising a height adjustment arrangement to enable vertical translation of the engine frame relative to the intermediate frame.

9. The gas turbine engine stand as claimed in claim 8 wherein the height adjustment arrangement has at least two defined vertical positions including an engine split position and a transportation position.

10. The gas turbine engine stand as claimed in claim 1 wherein the engine frame comprises at least one load transfer flange to engage with the first engagement feature.

11. The gas turbine engine stand as claimed in claim 10 wherein the load transfer flange is engaged by extension of the load transfer arrangement.

12. The gas turbine engine stand as claimed in claim 1 wherein the load transfer arrangement includes a jack to vertically translate the engine frame relative to the base frame.

13. The gas turbine engine stand as claimed in claim 1 wherein the base frame has two slide rails that are parallel to each other.

14. The gas turbine engine stand as claimed in claim 1 further comprising two load transfer arrangements.

15. The gas turbine engine stand as claimed in claim 1 further comprising an axial drive mechanism to effect the axial translation of the engine frame relative to the base frame.

16. The gas turbine engine stand as claimed in claim 1 wherein the base frame further comprises alignment features to engage with corresponding features on a gas turbine engine fan stand.

17. The gas turbine engine stand assembly comprising:
a gas turbine engine fan stand having a base frame and a fan case frame; and
a gas turbine engine stand as claimed in claim 1.

\* \* \* \* \*